Jan. 7, 1969    SABURO KOBAYASHI    3,420,345

CENTRIFUGAL TORQUE CONVERTER

Filed Sept. 30, 1966

INVENTOR
SABURO KOBAYASHI
BY Buckman and Archer
ATTORNEYS

United States Patent Office 3,420,345
Patented Jan. 7, 1969

3,420,345
CENTRIFUGAL TORQUE CONVERTER
Saburo Kobayashi, No. 465, 3-chome, Sekiya-Tamachi
Nigata-shi, Nigata-ken, Japan
Filed Sept. 30, 1966, Ser. No. 583,325
Claims priority, application Japan, Oct. 16, 1965,
40/63,643
U.S. Cl. 192—103                            6 Claims
Int. Cl. F16d 43/06

ABSTRACT OF THE DISCLOSURE

A centrifugal torque converter having input and output members in a direct drive and having centrifugal weight means disposed therebetween, the input torque supplied to the output member being effectively amplified by the centrifugal weight means when the speed ratio between the input member and the output member is greater than 1:1.

---

The present invention relates to a centrifugal torque converter and more particularly to a centrifugal torque converter of the type in which a torque is amplified by utilizing centrifugal force created by one or more centrifugal weights provided between an input member and an output member.

Heretofore, various types of stepless speed change devices have been known but, for the particular use with automobiles, the so-called hydraulic torque converter has only been successful in view of size, weight and torque transmission capacity. This type of torque converter, however, has a serious disadvantage in that the power transmission efficiency is inherently low and this is particularly prominent at high speed ratios. An automobile equipped with such a torque converter, therefore, exhibits lower accelerating ability and increased fuel consumption particularly during travelling in an urban area wherein "stop and go" traffic is common and in addition the tractive force tends to be insufficient for ascending a slope.

An object of the present invention, therefore, is to obviate the aforementioned disadvantages possessed by the conventional torque converters.

Another object of the invention is to provide a centrifugal torque converter in which power transmission is effected purely mechanically by making use of the centrifugal force created by one or more centrifugal weights provided between an input shaft and an output shaft.

Other objects and advantages of the invention will become apparent from the detailed description provided below when taken in conjunction with the accompanying drawings, in which.

Figure 2:
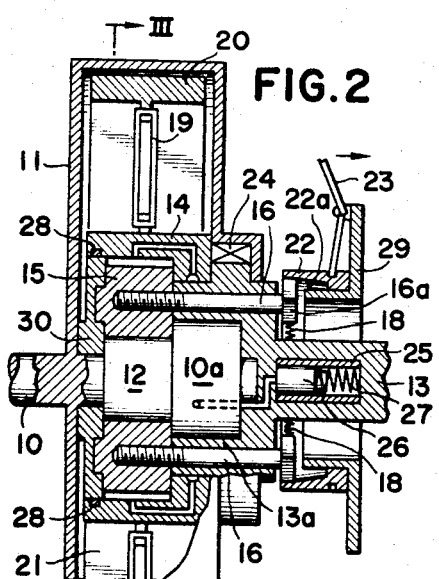
FIGURE 2 is a vertical cross sectional view of the centrifugal torque converter of the invention.

First of all, the principle upon which the inventive centrifugal torque converter operates will be explained with particular reference to FIG. 1. A resilient member 3, such as a leaf spring, has one end thereof fixed to an input member 1 and a weight 4 is fixed to the other end of said resilient member 3. The weight 4 is connected with an output member 2 by means of a member 5 which has one end secured to the weight 4 by means of a pin and the other end engaged with the output member 2 by suitable means, such as a claw clutch. Since the resilient member 3 has one end thereof fixed to the input member as described above, the weight 4 tends to move towards the inner periphery of the input member 1 due to its resiliency. On the other hand, one end of the member 5 is adapted to slide along the outer periphery of the output member 2 and to engage therewith at a predetermined point. The relative positions of the respective members, when the member 5 is in engagement at one end with the outer periphery of the output member 2 through the aforementioned engaging means, are shown by solid lines in FIG. 1.

Now, when the ratio of the rotational speed, i.e., the speed ratio, of the input member 1 and the output member 2 is greater than 1:1, the input member 1 rotates relative to the output member 2. Assuming that the input member 1 rotates in the direction of the arrow A in FIG. 1, with the output member 2 being held stationary, the resilient member 3 is caused to deflect as the input member 1 rotates, because one end of the member 5 is fixed in engagement with the output member 2. Consequently, the resilient member 3, weight 4 and power transmitting member 5 take the respective positions shown by the dot-dash lines in FIG. 1. In this case, since the converter is so arranged that the engagement of the member 5 with the output member 2 is released in these positions, one end of the member 5 slides on the outer periphery of the output member 2 freely until it reaches the next engagement point. The rotational torque produced by the input member 1 during its movement, with said engaging means being in the engaged position, is transmitted to the output member 2 through the resilient member 3, weight 4 and power transmitting member 5. In this case, the weight 4, according to the present invention, moves about the point 6 where the member 5 is pin-connected with the output member 2, along an arcuate track of a curvature equal in radius to the length of said member 5. The member 5, therefore, is given a tensile force by the centrifugal force created in the weight 4, thus acting to drive the output member 2.

In summary, in the torque converter of the present invention, the driving torque to be transmitted to the output shaft is effectively amplified by the centrifugal force of the weight provided interior of the converter when the speed ratio between the input member 1 and the output member 2 is greater than 1:1.

When, for example, an automobile equipped with the present converter is suitably accelerated to a high speed after starting, the load imposed on the converter is reduced and finally the speed ratio between the input and output members reaches to 1:1, namely the input and output members are brought in direct connection. Under such condition, the weight 4 is held in the state of equilibrium in a position between the solid lines and the dot-dash lines in FIG. 1. Because of such a complete direct connection between the input and output members, without the member 5 being disengaged from the output member 2, the power transmission efficiency is markedly enhanced.

The torque converter based upon the principle of the present invention as set forth hereinabove will now be described by way of the preferred embodiment. Referring to FIG. 2, an input shaft 10 is formed at one end with a hollow rotary drum 11 and a cam 12 is provided at an enlarged diameter extension 10a which is concentric with the shaft 10 and extending interiorly of the drum.

An output shaft 13 has a block 13a formed at its end and on the outer periphery of said block 13a an annular member 14 is rotatably mounted in concentrical relation with said shaft 13. The annular member 14 has one end thereof slidably mounted on the outer periphery of end plate 30 which are loosely mounted on the shaft 10 and fixed to the end surface of the block 13a by bolts 31. The output shaft 13 is connected with the input shaft 10 by means of a recess formed in the block 13a of the output shaft 13 at its end surface and the enlarged diameter extension 10a of the input shaft 10 rotatably fitted in said recess.

Figure 3:
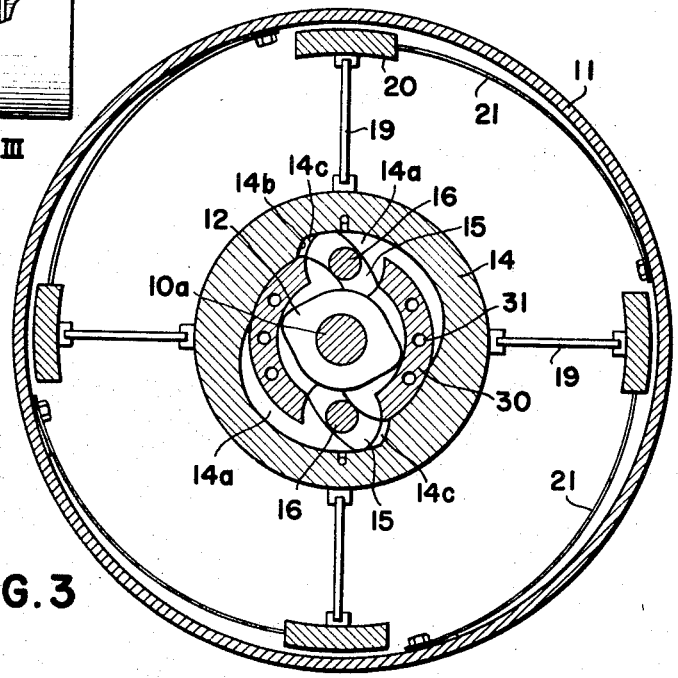
FIGURE 3 is a cross sectional view taken on the line III—III of FIG. 2.

The block 13a has the end portion thereof cut-out at diametrically opposite locations for receiving claws 15 therein, said claws being supported by shafts 16 so as to be rotatable about said respective shafts freely. As best shown in FIG. 3, recesses 14a are formed in the inner periphery of the annular member 14 for receiving said claws 15. Each of the claws 15 is resiliently biased clockwise as seen in FIG. 3 by means of a spring 18 which is connected at one end to the corresponding claw 16a and the other end to the output shaft, and each claw is engageable with shoulders 14b formed at the end extremities of said recesses. When the input shaft 10 makes a relative rotation to the output shaft 13 and reaches to a predetermined point, with the claws 15 being held in engagement with the shoulders 14b in the recesses 14a, the projections of the cam 12 come in engagement with the ends of the respective claws 15 to cause said claws to rotate about the shafts 16, so that the claws 15 are released from engagement with the shoulders 14b.

The claw clutch of the construction described provides the engaging means mentioned in the previous description on the principle of the operation of the inventive torque converter. Four wire members 19, corresponding to the power transmitting member 5, are arranged about the outer periphery of the annular member 14 in equally spaced relation, each of which wire members has one end rotatably connected to the annular member by means of a pin acting as a pivot point (not shown) and the other end connected to a weight 20 also by means of a pin. The weight 20 is fixed to one end of a leaf spring 21 which is fixed at the other end of the inner periphery of the drum 11.

Referring to FIG. 2, reference numeral 29 indicates a fixed portion which is either formed integrally with or firmly connected, for example, to the body of an automobile and 22 indicates an annular operating member which is operated by a linkage 23 to slide on the cylindrical boss of the fixed portion 29. The annular operating member 22 has formed therein a tapered hole 22a, so that when it is moved to the left in FIG. 2 by the linkage 23, it causes the shafts 16 to rotate about the axial axis of the input and output members by the camming action due to the engagement between the heads 16a of the shafts 16 (which in turn are connected to the claws 15) and the tapered inner surface of the hole 22a, against the force of the springs 18 having one end connected to the output shaft 13, so as to release the engagement of the claws 15 with the shoulders 14b. A one-way clutch 24 is provided which is adapted to be held in disengaged position when the rotational speed of the drum 11 is higher than that of the output shaft 13 and in engaged position when the former is lower than the latter to provide for the utilization of the engine brake.

Figure 1:
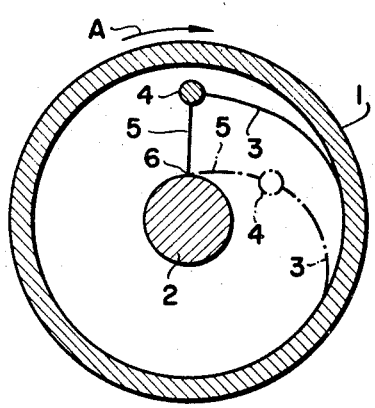
FIGURE 1 is an illustrative view for the purpose of illustrating the principle upon which the centrifugal torque converter of the present invention operates.

In the construction described above and illustrated in FIGS. 2 and 3, the hollow rotary drum 11 corresponds to the input member 1 shown in FIG. 1 and the output shaft 13 corresponds to the output member 2 shown in FIG. 1. It will be obvious that the function as explained previously with reference to FIG. 1 can be obtained by giving an input to said hollow rotary drum 11. Thus, the rotation of the input shaft and drum 11 is in direct drive with the output member 13 by means of the shoulders 14b of the rotatable annular member 14 bearing against the claws 15 of the output member 13. The output member 13 is forced to rotate with the input member until the cam means 12 is caused to disengage the claws 15 from the shoulders 14b after the input shaft 10 makes a predetermined relative rotation of the output shaft 13.

The construction described, however, is not entirely satisfactory in that the engagement of the claw clutch is accompanied by sound resulting from the mechanical impact and the parts subjecting to such impact tend to be worn off or damaged.

According to the present invention, such disadvantages may be eliminated by filling the claw clutch chamber, defined by the annular member 14 and the block 13a, with an operating oil. By so doing, a portion of the recess 14a in the proximity of the shoulder 14b, as the claw 15 is raised and approaches the shoulder 14b for engagement therewith, is sealed by the block 13a and claw 15, forming a sealed chamber 14c and the operating oil confined in said sealed chamber serves to alleviate the noise generated as a result of the collision of the claw 15 against the shoulder 14b. While no cutout nor slit is formed in the surface at the end of the claw 15 at which said claw engages the shoulder 14b, so as to obtain a satisfactory oil sealing effect, an oil passage slit (not shown) is formed in the surface at the other end of said claw so as to prevent the operating oil from being trapped at the portions of the recess other than the sealed chamber 14c during rotation of said claw. The output shaft 13 is formed therein with a cylindrical cavity to permit the operating oil to be released therefrom which is momentarily extruded from the clutch chamber during operation. The cylindrical cavity is lined with a liner 25 and a floating piston (pump means) 26 is disposed within the liner, and the floating piston is urged in one direction by a spring 27. The liner chamber on the side opposite to the spring 27 with respect to the floating piston 26 is in communication with the clutch chamber through an oil passage. Sealing materials as indicated at 28 are provided to ensure complete sealing of the chamber 14c.

As apparent from the foregoing description, it is possible, according to the present invention, to amplify effectively the input torque to be given to the output shaft by the centrifugal force created in the centrifugal weight when there is a difference in rotational frequency between the input shaft and output shaft, i.e when the speed is to be changed, and the power transmission in this case is effected purely mechanically. Accordingly, the power transmission efficiency obtained is higher than that obtained from torque converts of hydraulic type. Moreover, the power transmission may be shifted to nonstage speed change automatically as the load on the output shaft increases, while a direct drive can be obtained purely mechanically as the load decreases.

EXAMPLE

In order to confirm the advantageous effect of the torque converter according to the present invention, stalling torques of the output shaft were measured at the outer periphery of the output shaft for variable input rotational frequencies, the result of which are shown below.

| Rotational speed (r.p.m.) | Stalling torque | |
| --- | --- | --- |
| | Kg. (about) | Pounds |
| 80 | 1 | 2.20 |
| 165 | 3.3 | 7.27 |
| 330 | 12 | 26.4 |
| 660 | 45 | 99.2 |

In the above experiment, four weights, each weighing 150 grams (0.331 lb.) and the total weight being 600 grams (1.32 lbs.), were used, the radius of gyration of said weight being 7.5 cm. (2.96 inches), the angular velocity ratio (the ratio of the angular velocity of the weight rotating about the engaging point at the radius of gyration to that of the prime mover) being 1.5 and the distance between the engaging point and the axis of the output member being 6 cm. (2.36 inches).

The details of the structure may be modified substantially without departing from the spirit of the invention and exclusive use of such modification as come within the scope of the appended claims is contemplated.

I claim:

1. A centrifugal torque converter having axially aligned input and output members, said input member having an open-ended hollow cup-shaped rotary drum extending from an input shaft having cam means provided thereabout, a concentrically disposed rotatable clutch drum disposed about said cam means and being connected to said rotary drum by a plurality of centrifugal weight means resiliently connected to the inner periphery of said rotary drum and to the outer periphery of said clutch drum by linkage means, said output member having claws which are engageable with said cam means and internal shoulder means provided on the inner periphery of said rotatable clutch drum so as to provide a direct mechanical drive means between said input and output members, biasing means for maintaining said claws in an engaged position with said shoulder means, said cam means when rotated a predetermined angular distance relative to said output member causes a camming and bearing action against said claws so as to disengage said claws from the shoulder means of said clutch drum, whereby the input torque supplied to said output member is amplified by said centrifugal weight means when the speed ratio between the input and the output member is greater than 1:1.

2. The centrifugal torque converter acocrding to claim 1, wherein the resilient connection of the centrifugal weight means to the inner periphery of said rotary drum comprises a leaf spring.

3. The centrifugal torque converter according to claim 1, wherein said linkage means connecting said centrifugal weight means to said clutch drum comprising wire members and pin means pivotally connecting each end of said wire members to said centrifugal weight means and to said clutch drum.

4. The centrifugal torque converter according to claim 1, wherein manually operable means are provided for rotating said claws out of engagement with said shoulder means of said clutch drum.

5. The centrifugal torque converter according to claim 1, wherein the cavity formed by said clutch drum contains hydraulic fluid so as to eliminate the noise generated by the engagement between the claws and the clutch drum.

6. The centrifugal torque converter according to claim 1, wherein pump means are provided in said output member for maintaining said hydraulic fluid under pressure.

References Cited
UNITED STATES PATENTS

| | | | |
|---|---|---|---|
| 627,613 | 6/1899 | Goolman | 192—105 |
| 743,143 | 11/1903 | Brown | 192—105 X |
| 798,188 | 8/1905 | Kehoe | 192—71 X |
| 843,609 | 2/1907 | Johnston | 192—71 X |
| 1,745,738 | 2/1930 | Carter | 192—103 |
| 1,758,352 | 5/1930 | Campbell | 192—71 |

BENJAMIN W. WYCHE, *Primary Examiner.*

U.S. Cl. X.R.

64—25; 192—56, 71